(12) United States Patent
Schumacher et al.

(10) Patent No.: US 11,858,441 B2
(45) Date of Patent: Jan. 2, 2024

(54) CONTROL UNIT AND METHOD FOR ACTIVATING A PERSONAL PROTECTION MEANS OF A VEHICLE

(71) Applicant: Robert Bosch GmbH, Stuttgart (DE)

(72) Inventors: Hartmut Schumacher, Freiberg (DE); Carsten List, Walheim (DE); Ruediger Karner, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 146 days.

(21) Appl. No.: 17/610,822

(22) PCT Filed: Jul. 9, 2020

(86) PCT No.: PCT/EP2020/069371
§ 371 (c)(1),
(2) Date: Nov. 12, 2021

(87) PCT Pub. No.: WO2021/013560
PCT Pub. Date: Jan. 28, 2021

(65) Prior Publication Data
US 2022/0203915 A1 Jun. 30, 2022

(30) Foreign Application Priority Data

Jul. 19, 2019 (DE) ..................... 10 2019 210 706.0

(51) Int. Cl.
*B60R 21/01* (2006.01)
(52) U.S. Cl.
CPC .... *B60R 21/01* (2013.01); *B60R 2021/01054* (2013.01); *B60R 2021/01286* (2013.01)
(58) Field of Classification Search
CPC .......... B60R 21/01; B60R 2021/01054; B60R 2021/01286; B60R 21/017; B60R 2021/01293; B60R 16/023; B60R 2021/0104; B60R 2021/01211
See application file for complete search history.

(56) References Cited

FOREIGN PATENT DOCUMENTS

| EP | 1970262 A2 * | 9/2008 |
| JP | 2009067289 A | 4/2009 |
| JP | 2009220803 A | 10/2009 |
| JP | 2017206120 A | 11/2017 |
| WO | 2014199779 A1 | 12/2014 |

OTHER PUBLICATIONS

ISO 11898-1:2015 Standard, 2015, pp. 1-74.
International Search Report for PCT/EP2020/069371, dated Oct. 22, 2020.
Komaki et al., "Development of the Electronic "Safing" System for Airbag Ecus," Fujitsu Ten Technical Journal, 2005, pp. 17-26. <https://www.denso-ten.com/business/technicaljournal/pdf/24-3.pdf>.

* cited by examiner

*Primary Examiner* — Brian P Sweeney
(74) *Attorney, Agent, or Firm* — NORTON ROSE FULBRIGHT US LLP; Gerard A. Messina

(57) ABSTRACT

A control unit for activating a personal protection device of a vehicle. The control unit includes a compute module, which is in one-piece and which includes a first area including a permanently wired processing structure and a second area including a programmable processing structure, the compute module being designed to carry out a processing instruction for activating the personal protection device in at least the second area.

11 Claims, 3 Drawing Sheets

CONTROL UNIT AND METHOD FOR ACTIVATING A PERSONAL PROTECTION MEANS OF A VEHICLE

FIELD

The present invention is directed to a control unit and a method for activating a personal protection device in a vehicle. The present invention is also a computer program.

Control units for activating personal protection means of a vehicle have to evaluate a large amount of data from greatly varying sensors with the aid of an algorithm or a processing instruction and in this way make a decision for activating the personal protection means. This requires a high processing speed during the processing of the data in the relevant control units.

SUMMARY

Against this background, the present invention provides a control unit for activating a personal protection means (i.e., device) of a vehicle, furthermore a corresponding method, and finally a corresponding computer program. Advantageous refinements and improvements of the control unit are possible by way of the measures disclosed herein.

The approach presented here provides a control unit for activating a personal protection means of a vehicle, the control unit at least including the following feature:

a compute module, which is in one-piece and which includes a first area including a permanently wired processing structure and a second area including a programmable processing structure, the compute module being designed to carry out a processing instruction for activating the personal protection means in at least the second area.

A compute module may be understood, for example, as a hardware unit which is designed to execute numeric, logical, and/or algebraic operations and process data from sensors in this way. A compute module which is manufactured in one-piece as an integral unit, for example, on a shared substrate, and includes multiple areas which have different functions or different structures. The individual areas may be formed for this purpose in a shared manufacturing step or may be formed by different and/or successively executed manufacturing steps. An area including a permanently wired processing structure may be understood as an area of the compute module in which certain components of the compute module are already permanently embedded in hardware of the compute module during the manufacturing of the compute module. For example, such a permanently wired processing structure may be implemented in that connecting lines between individual components of the compute module (for example, transistors, lines, memory units, control units, or the like) in the first area are formed unchangeably in the hardware of the compute module. A second area of the compute module including the programmable processing structure may be understood, for example, as a unit which is configured by loading a program in such a way that it may carry out program steps in accordance with the commands of the program. For example, such a second area may be implemented as a programmable microprocessor structure in the hardware of the compute module.

The control unit may include, for example, at least one processing unit for processing signals or data, at least one memory unit for storing signals or data, at least one interface to a sensor or an actuator for reading in sensor signals from the sensor or for outputting control signals to the actuator, and/or at least one communication interface for reading in or outputting data which are embedded in a communication protocol. The processing unit may be, for example, an ASIC, a signal processor, a microcontroller, and/or the like and/or may include such an element, the memory unit being able to be a flash memory, an EEPROM, or a magnetic memory unit. The communication interface may be designed to read in or output data in a wireless and/or hardwired manner, a communication interface which may read in or output data in a hardwired manner being able to read in these data, for example, electrically or optically from a corresponding data transfer line or output these data into a corresponding data transfer line.

A control unit may be understood in the present case as an electrical device which processes sensor signals and outputs control and/or data signals as a function thereof. The control unit may include an interface which may be designed as hardware and/or software. With a hardware design, the interfaces may be, for example, part of a so-called system ASIC, which includes greatly varying functions of the device. However, it is also possible that the interfaces are separate integrated circuits or are made up at least partially of discrete components. In a software design, the interfaces may be software modules which are present, for example, on a microcontroller along with other software modules.

The present invention is based on the finding that a very high level of flexibility in carrying out a processing instruction for activating a personal protection means is possible due to the embedding which has gradually become possible in manufacturing of programmable elements in addition to permanently wired elements in a compute module. In particular, the fact may be utilized in this way that, on the one hand, different processing instructions may be loaded into the second area including the programmable processing structure for different vehicle types, so that the triggering criteria for triggering the personal protection means may be varied for different vehicle types and thus a high level of personal safety may be achieved for the particular vehicle types. At the same time, areas including a permanently wired processing structure may be used, for example, for loading the processing instruction into the second area and/or embedding processing steps which recur frequently or are complex numerically or with respect to circuitry directly in a hardware structure, which may then be carried out very rapidly and may thus result in acceleration of the decision about the activation of the personal protection means. Furthermore, a control unit may be manufactured in this way which does not have to be defined down to the last detail during the manufacturing, but rather the already manufactured control units may still be reconfigured, for example, in the event of a subsequently recognized improvement in the processing instruction, so that control units already manufactured may still continue to be used.

One specific embodiment of the present invention is particularly advantageous, in which the first and second areas of the compute module are implemented in different areas of a shared semiconductor component. Such a specific embodiment of the approach provided here offers the advantage that manufacturing methods for semiconductor components which are already extensively optimized may be used, so that such a specific embodiment may be manufactured very cost-effectively and efficiently.

According to another specific embodiment of the present invention, the control unit may also include a memory unit, in which the processing instruction is storable and is loadable into the second area of the compute module after a startup of the control unit. Such a specific embodiment of the approach provided here offers the advantage of a very simple and cost-effective possibility for loading a processing instruction into the second area of the compute module, due to which flexible and rapid programming or reprogramming of the control unit may be implemented.

According to another specific embodiment of the present invention, at least one communication interface may be provided for transferring data to a unit outside the control unit, in particular the communication interface being contactable from the second area including the programmable processing structure and/or the communication interface not being contactable from the first area of the permanently wired processing structure. A communication interface may be understood, for example, as a unit of the control unit via which data are transferred from sensors to the compute module or via which signals for activating the personal protection means are transferred from the compute module. Such a specific embodiment of the approach provided here offers the advantage of being able to communicate very flexibly with the corresponding components outside the control unit, the permanently wired processing structure being able to be used in particular for assisting the carrying out of steps of the processing instruction or for loading the processing instruction into the second area.

One specific embodiment of the present invention is particularly advantageous, in which the communication interface is designed to be a LIN bus interface, a CAN bus interface, a CAN-FD bus interface, or a FlexRay bus interface. Such a specific embodiment offers the advantage of being able to efficiently read out data formats used particularly frequently in vehicle technology, to provide the corresponding data to the compute module.

According to another specific embodiment of the present invention, a clock generator may be provided, which is formed or situated outside the compute module. Such a specific embodiment offers the advantage of ensuring high precision in the processing of sensor data due to the use of a clock signal, which is usually very precise or accurate, supplied from a clock generator situated outside the compute module, to enable the activation of the personal protection means of the vehicle.

One specific embodiment of the present invention is particularly advantageous in which the clock generator is formed by a quartz oscillator or includes a quartz oscillator. The use of such a quartz oscillator offers the advantage that a clock signal generated thereby is very stable and precise and thus supplies a high quality in the ascertainment of the fulfillment of triggering criteria for a personal protection means compared to a clock signal generated in another way, for example, by an RC circuit.

Furthermore, one specific embodiment of the present invention is advantageous in which the compute module is designed to carry out at least a part of the processing instruction in the first area. Such a specific embodiment offers the advantage that, for example, a more complex command or step may be moved out of the processing instruction and executed in the first area of the compute module, due to which, on the one hand, the processing speed is increased and, on the other hand, the structure of the second area does not have to be kept unnecessarily large.

One specific embodiment of the present invention is particularly advantageous in which the compute module is designed to activate an occupant protection means of the vehicle, in particular an airbag, as the personal protection means. Such a specific embodiment of the approach provided here offers the advantage of very fast and nonetheless finely tunable triggering of the personal protection means also for the use as an occupant protection means, in the case of which a short triggering or reaction time is required.

One specific embodiment of the present invention as a method for manufacturing control units as disclosed herein is also particularly advantageous, the method including the following step:

storing a first processing instruction in a memory unit of a first of the control units and storing a second processing instruction different from the first processing instruction in a memory unit of a second of the control units.

A first processing instruction may be understood, for example, as a processing instruction which activates triggering of a personal protection means in a vehicle of a first vehicle type, a second processing instruction being able to be understood, for example, as a processing instruction which activates triggering of a personal protection means in a vehicle of a second vehicle type. Such a specific embodiment offers the advantage of being able to program a control unit individually depending on the use in one of multiple different vehicle types to achieve the highest possible flexibility with short reaction times in different usage scenarios for the particular vehicle types.

Furthermore, one specific embodiment of the present invention is a method for activating a personal protection means of a vehicle is advantageous, the method including the following steps:

reading out the processing instruction from of a memory unit of a control unit according to one of the variants provided here and loading the processing instruction into the second area of the compute module; and carrying out the processing instruction in the second area of the compute module to activate the personal protection means of the vehicle.

Such a specific embodiment of the present invention offers the advantage of being able to carry out rapid and nonetheless precise activation, which is flexibly adaptable to the usage scenarios, of the personal protection means in a vehicle (for example of a specific) vehicle type.

This or these method(s) may be implemented, for example, in software or hardware or in a mixed form made up of software and hardware, for example, in a control unit, for example, by a variant of the control unit as provided here.

A computer program product or a computer program having program code which may be stored on a machine-readable carrier or memory medium such as a semiconductor memory, a hard drive memory, or an optical memory and is used to carry out, implement, and/or activate the steps of the method according to one of the above-described specific embodiments, in particular if the program product or program is executed on a computer or a device, is also advantageous.

Exemplary embodiments of the present invention are shown in the figures and explained in greater detail in the following description.

DETAILED DESCRIPTION OF EXAMPLE EMBODIMENTS

Figure 1:
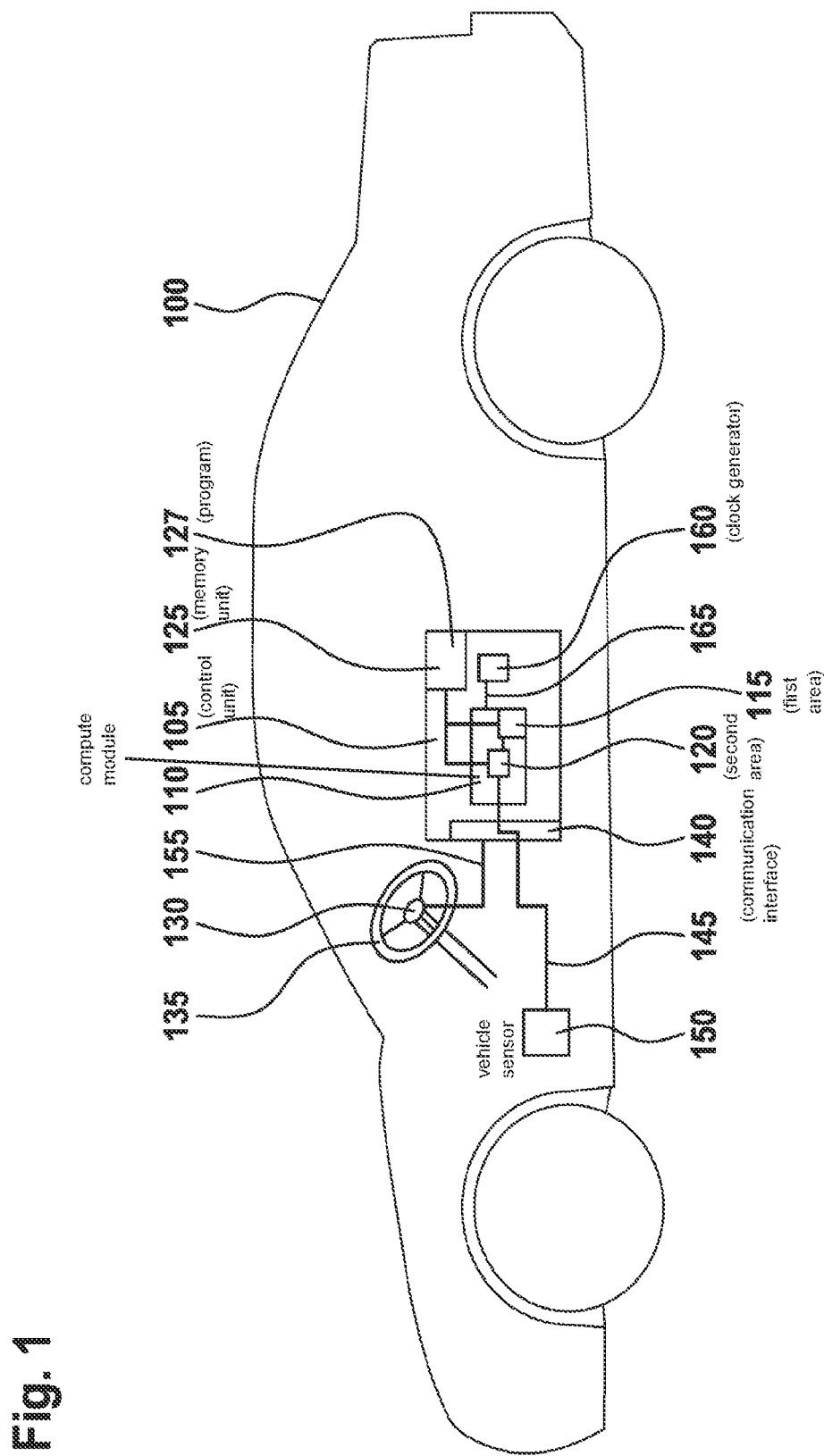
FIG. 1 shows a vehicle including a control unit according to one exemplary embodiment of the present invention.

In the following description of advantageous exemplary embodiments of the present approach, identical or similar reference numerals are used for the elements shown in the various figures and that act similarly, a repeated description of these elements being omitted.

FIG. 1 shows a vehicle 100 including a control unit 105 according to one exemplary embodiment of the approach presented here. Control unit 105 includes a compute module 110, which is in one-piece and which is manufactured, for example, as a semiconductor component on a shared substrate. Compute module 110 includes a first area 115 including a permanently wired processing structure and a second area 120 including a programmable processing structure. For example, second area 120 is implemented as a microprocessor core, whereas first area 115 is implemented as an ASIC element or ASIC structure. Furthermore, the control unit includes a memory unit 125, in which, for example, a program and/or a processing instruction 127 is stored for activating a personal protection means 130, for example, an airbag. Program and/or processing instruction 127 may be loaded, for example, after startup of control unit 105 from memory unit 125 into second area 120. For example, first area 115 may be designed as a memory controller, which carries out the readout of the processing instruction from memory unit 125 and carries out or at least supervises the loading of processing instruction 127 into second area 120. Alternatively or additionally, first area 115 may also be designed to carry out complex operations which are required according to one or multiple commands in processing instruction 127 to be able to establish a presence of a triggering criterion for activating a personal protection means 130.

To trigger personal protection means (i.e., device) 130, which is designed here, for example, in the form of a driver airbag situated in a steering wheel 135, according to those criteria corresponding to processing instruction 127, sensor signals 145 of a vehicle sensor 150 are read in with the aid of a communication interface 140, which may be designed, for example, as a LIN, CAN, CAN FD, and/or FlexRay interface, and loaded, for example, into second area 120 including the programmable processor structure. Sensor signals 145 may be radar signals for this purpose if vehicle sensor 150 is designed as a radar sensor, these sensor signals 145 then representing, for example, the approach, a velocity, a distance, or the like of an external vehicle (not shown in FIG. 1) to vehicle 100.

In FIG. 1, for the sake of clarity, only signals from a single vehicle sensor 150 are plotted for this purpose, which are evaluated in control unit 105. However, for those skilled in the art it is obvious that sensor signals 145 may also contain data from multiple vehicle sensors, which may also detect different physical parameters, for example.

In second area 120 of compute module 110, these sensor signals 145 are then processed using processing instruction 127 loaded from memory unit 125 and checked for the presence of certain triggering criteria for personal protection means 130. During such an evaluation, for example, it may occur that complex numeric or algorithmic operations are to be carried out efficiently and rapidly in a permanently wired processing structure, as is implemented, for example, in first area 115 of compute module 110. For this purpose, for example, a part of sensor signals 145 or intermediate results from the processing of sensor signals 145 may be transferred into first area 115, further processed there, and subsequently the obtained results may be transferred back into second area 120. In this way, the presence of certain triggering criteria in sensor signals 145 may be checked very efficiently. If it is established, for example, in compute module 110 that the triggering criteria for activating personal protection means 130 are met, a corresponding trigger signal 155 may be transferred, for example, from second area 120 via communication interface 140 to personal protection means 130, so that this personal protection means 130 is activated, for example, the airbag unfolds.

To be able to operate particularly precisely, control unit 105 includes a clock generator 160, which is situated outside compute module 110 and is designed, for example, as a quartz oscillator. Clock generator 160 generates a clock signal 165 here, which is used as the basis of the signal processing in first area 115 and/or second area 120 of compute module 110 or communication interface 140. The use of such an external clock generator 160 outside compute module 110 offers the advantage here that components which are very precise, robust, and have long-term stability such as the quartz oscillator may be used to provide clock signal 165. In this way, it is ensured that the processing of sensor signals 145 in first area 115 and/or second area 120 may be carried out with high precision.

In a further exemplary embodiment, communication interface 140 and/or memory unit 125 may also be applied or embedded on or in the substrate in which the compute module 110, which is in one-piece, is also implemented. In this way, in one manufacturing process, not only compute module 110, but also communication interface 140 and/or memory unit 125 may be manufactured, which enables further simplification in manufacturing control unit 105.

In summary, it may be noted that modern airbag systems use system basis chips (SBC), in which, in addition to the complete voltage supply in operation and autonomy with central RESET supervision, further functional blocks such as LIN transceiver; PSI-IF, switch/Hall sensor IF, high/low ignition output stages, safety controller (watchdog, redundant plausibility check of crash signals), and LED high-side/low-side drivers are integrated.

One goal of the approach presented here is to supplement the SBC as control unit 105 with a μC-core (for example, in the form of second area 120) and suitable communication controllers such as LIN, CAN, CAN FD (ISO 11898-1: 2015), and optionally FlexRay (V2.1), for example, in the form of communication interface 140.

Furthermore, the corresponding transceiver may also be optionally integrated in the SBC, the SBC being able to obtain, in addition to the present SPI monitoring, the monitoring capacity of vehicle buses LIN, CAN, CAN FD, FlexRay (safety architecture). However, only the main airbag/safety control unit μC or processor has read and write access to the corresponding buses, which is implemented, for example, in second area 120 and may be supplied with data with the condition (ASIL>=C) via the corresponding accessible transceiver, which may also optionally be able to assist SLEEP systems.

The monitoring of the fast communication buses at up to 10 Mb/s may be implemented particularly well by using a quartz-stable integrated oscillator as the time base for SBC 105. The use of a μC-core (microcontroller core) in the form of second area 120 of compute module 110 together with an SBC program such as processing instruction 127, stored in a mask ROM or programmable FLASH including parameterization such as memory unit 125 by the main airbag/safety control units μC or processor in SRAM such as second area 120, enables particularly flexible diagnosis, supervision, and signal processing of personal protection means 130, such as an airbag system here, for example, and of the SBC as control unit 105.

The flexibility and performance of the SBC or control unit 130 is significantly increased, for example, by μC-core 120, over the presently used HW state machines, as are implemented, for example, in first area 115 including the permanently wired processing structure. The present safety controller of the SBC with restriction to SPI—monitoring of the central sensor data (for example sensor signals 145) or indirectly the PSI sensor and switch/Hall sensor data becomes, for example, due to the monitoring function of the communication interface such as communication interface 140 (buses), the safety controller of all relevant data as sensor signals 145. Data are to be mentioned here, for example, as sensor signals 145 of vehicle sensors 150 of the passenger compartment sensing (IR camera), seat occupancies, etc., and the pre-crash detection (radar). The safety controller is thus, for example, capable of giving access to safety-relevant actuators (ignition circuits, LEA actuators, motor-driven belt tensioners, emergency braking systems, . . . ) as personal protection means 130 even before the crash time ($T_0$) if the required criteria are met.

By using an independent quartz-stable SBC time base and not, as before, a relatively inaccurate RC clock, for example, the watchdog function, the redundant SBC crash signal assessment, and/or the switching regulator frequency may be executed significantly more precisely. In particular, for example, the quartz-stable time base of the SBC enables relevant data of fast communication buses 140 (up to 10 Mb/s) such as CAN, CAN FD, FlexRay to be supervised independently.

Further SBCs or SCCs may also be coupled on synchronously by providing a master SBC (ECLK), without, for example, independent quartz oscillators being required in the slave devices (dependent components).

This redundant, diverse assessment of communication data, in particular for devices (also sensors) of the interior sensing or the pre-crash detection, expands, for example, the previous SCON functionality of the HW state-based present SBC. The additional DISABLE functionality of the actuators and devices controllable via communication buses takes place in that, for example, the transmit (write) access of the main μC or processor to the communication bus is withdrawn, for example, if the enable criteria of the expanded SCON function of the SBC are not met. This may be carried out, for example, by splitting the activation message into partial messages.

For example, if the SBC recognizes a first partial message without existing release, for example, the transceiver is blocked (DISABLE) or the transmit line TxD line of the transceiver to the main μC or processor is interrupted by the expanded SCON.

Instead of the previously used logic state machine, for example, a μC-core ($^{16}/_{32}$) bit is integrated as second area 120, for example, by ARM into the system ASIC. The overall diagnostic software of the ignition circuits including supply voltage and safety semiconductor check, the PSI sensor IF and sensor check, the AIO LED driver (optionally including PWM control) check, the external switch/Hall sensor IF check, the energy reserve check, the communication transceiver check, the voltage supervision of external ECU supply lines, and a large number of SBC internal voltages (external KL30, KL15, VZP internal VUP, VER, VAS, VSYNC, VST50, VST33, VCORE, VREFi, AlNi, AlOi, VHi, Zkpi, Zkmi, PSli) is executed, for example, corresponding to the program code such as processing instruction 127, or stored, for example, in a mask ROM as memory unit 125 or optionally in a programmable FLASH memory as memory unit 125.

The parameterization may be carried out, for example, by data exchange between main airbag μC and the SBC-SRAM. The time base is formed, for example, by an integrated oscillator circuit including external quartz, to enable the stability and accuracy requirements for connecting fast communication controllers.

The PLL circuit including frequency divider is used, for example, for synthesizing the required SBC internal frequencies for μC-core, the clocked SBC assemblies, the switching regulator frequencies, the required digital filters, and the output of an SBC-based external clock signal (ECLK), for coupling on (cascading) further SBCs or expansion components (system companion chips (SCC)).

The timer watchdog is used, for example, for checking the time base of a separate main μC or processor in an airbag/safety control unit. This check may be executed, for example, on the basis of the quartz-accuracy time base of the SBC significantly more accurately ($<=1\%$) than using the present RC oscillators ($<15\%$) in the HW-SBCs.

The operating software controls, for example, the data exchange with the main airbag μC via the SPI interface, the monitoring SPI (read only), for example, communication interfaces 140 LIN, CAN FD, CAN, optionally FlexRay (read only), the external switches and Hall sensor IF, and, for example, the PSI-IF to external sensors or sensor buses.

The data exchange via SPI includes, for example, the expanded watchdog functionality to check the foreground and the background tasks of the main ECU μC/processor, the continuous status exchange for system supervision, and the error handling by the main ECU μC.

The provision of the SBC-detected PSI sensor data, the switch and Hall sensor data via SPI to the main μC is used, for example, for the comprehensive crash/event recognition in its main algorithm.

The information acquisition via the monitoring SPI is used, for example, for the redundant evaluation of SPI-based data (for example, ECU central sensor system) and, for example, for detecting all sensor data placed by SBCs or SCCs on the SPI.

The redundant evaluation of SPI-based airbag sensor data and relevant communication interface-based data on the interior situation ((IR) camera) or on the precrash situation (radar), . . . , forms, for example, the new software safety controller of the SBC, which in the normal state blocks the ignition output stages and ignores fire commands of the main μC/processor if the evaluation does not meet certain settable release criteria. These release criteria may be designed very flexibly, for example, in an SBC including μC-core (complete release ↔ partial release) and in addition to crash situations ($T_0$) also includes releases before ($T_0$).

Via status lines (DISABLE line), for example, cascaded SBC or SCC may be coupled to the release decision of the master SBC. In addition to the classical ignition circuits, for example, certain communication-based safety relevant assemblies (reversible belt tensioner, emergency brake devices, . . . ) may also be activated by the safety controller of the SBC as personal protection means 130, for example, only by the main μC processor of the airbag/safety control unit if the monitored communication interface-based messages correspond to the release criteria of the redundant SBC evaluation.

The protective measure against a finally acting activation of a safety-relevant assembly controlled via a communication interface may also be carried out, for example, by interrupting the (transmit lines) TxD lines from the main μC to transceivers via switchable gates with the aid of suitable DISABLE lines of the SBC. Furthermore, an SBC DISABLE intervention on the transceiver is also possible.

For this purpose, for example, the activation messages of the main μC/processor may be split into partial steps. If the SBC recognizes, for example, by supervising communication bus 140, activation partial messages to safety-relevant assemblies without a release for this assembly being present in the SBC, for example, blocking of the further required parts of the activation message takes place.

Figure 2:
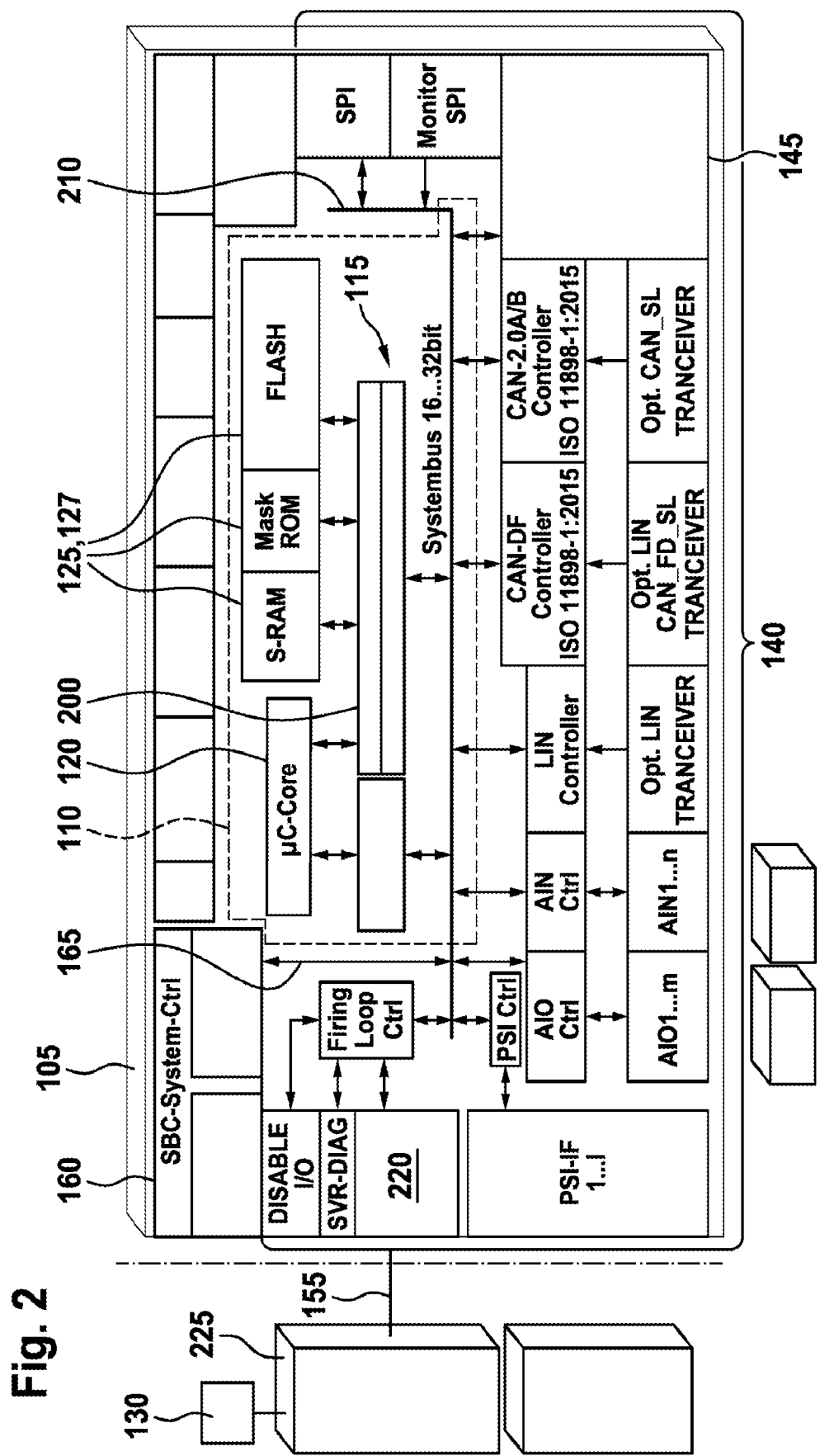
FIG. 2 shows a block diagram of an exemplary embodiment of the control unit in accordance with the present invention.

FIG. 2 shows a block diagram of an exemplary embodiment of control unit 105. Control unit 105 includes here a first area 115, which includes a permanently wired processing structure. First area 115 is designed in the exemplary embodiment shown in FIG. 2, for example, as a memory controller 200, which controls or supervises a readout of processing instruction 127 from a memory unit 125 designed as a SRAM, mask ROM, or FLASH and loads it with the aid of a system bus 210 via a bridge element 215 into second area 120 including the programmable processing structure, which is designed here as a microcontroller core (μC-core). Second area 120 may receive sensor signals 145 via communication interface 140 and process the commands according to processing instruction 127. If sensor signals 145 now correspondingly become triggering criteria, in second area 120 or in μC-core, triggering of personal protection means 130 may be activated with the aid of trigger signal 155 via a trigger circuit 220 of communication interface 140, which is then implemented by a trigger control circuit 225. Furthermore, a clock generator 160 in the form of a quartz oscillator may also be provided, which provides a clock signal 165 for the operation of first area 115, second area 120, memory unit 125, and/or communication interface 140.

Figure 3:
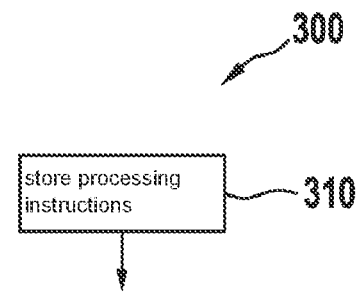
FIG. 3 shows a flowchart of a method for preparing a startup of control units according to a variant of the present invention.

FIG. 3 shows a flowchart of an exemplary embodiment of a method 300 for preparing a startup of control units according to a variant presented here. Method 300 includes a step 310 of storing a first processing instruction in a memory unit of a first of the control units and storing a second processing instruction different from the first processing instruction in a memory unit of a second of the control units.

Figure 4:
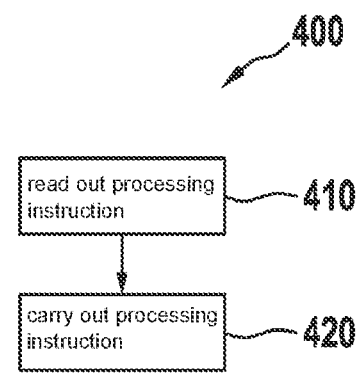
FIG. 4 shows a flowchart of a method for activating a personal protection means of a vehicle according to one exemplary embodiment of the present invention.

FIG. 4 shows a flowchart of an exemplary embodiment of a method 400 for activating a personal protection means of a vehicle, method 400 including a step 410 of reading out a processing instruction from a memory unit of a control unit according to a variant presented here and loading the processing instruction into the second area of the compute module. Furthermore, method 400 includes a step 420 of carrying out the processing instruction in the second area of the compute module to activate the personal protection means of the vehicle.

If an exemplary embodiment includes an "and/or" linkage between a first feature and a second feature, this is to be read to mean that the exemplary embodiment according to one specific embodiment includes both the first feature and the second feature and according to another specific embodiment includes either only the first feature or only the second feature.

What is claimed is:

1. A control unit for activating a personal protection device of a vehicle, comprising:
   a compute module, which is in one-piece and which includes a first area including a permanently wired processing structure and a second area including a programmable processing structure, the compute module being configured to carry out a processing instruction for activating the personal protection device in at least the second area; and
   a clock generator, which is formed or situated outside the compute module, wherein the clock generator is a quartz oscillator or includes a quartz oscillator.

2. The control unit as recited in claim 1, wherein the first and second areas of the compute module are implemented in different areas of a shared semiconductor component.

3. The control unit as recited in claim 1, further comprising:
   a memory unit, in which the processing instruction is storable, and after a startup of the control unit, is loadable into the second area of the compute module.

4. The control unit as recited in claim 1, further comprising:
   at least one communication interface configured to transfer data to a unit outside the control unit, the communication interface being contactable from the second area including the programmable processing structure and/or the communication interface not being contactable from the first area of the permanently wired processing structure of the communication interface.

5. The control unit as recited in claim 4, wherein the communication interface is a LIN bus interface, or a CAN bus interface, or a CAN FD bus interface, or a FlexRay bus interface.

6. The control unit as recited in claim 1, wherein the compute module is configured to carry out at least a part of the processing instruction in the first area.

7. The control unit as recited in claim 1, wherein the compute module is configured to activate an occupant protection device of the vehicle as the personal protection device, the occupant protection device being an airbag.

8. A method for preparing a startup of control units, the control units being for activating a personal protection device of a vehicle, the method comprising:
   storing a first processing instruction in a memory unit of a first of the control units and storing a second processing instruction different from the first processing instruction in a memory unit of a second of the control units;
   wherein the control units are for activating a personal protection device of a vehicle, and wherein each of the control units includes a compute module, which is in one-piece and which includes a first area including a permanently wired processing structure and a second area including a programmable processing structure, the compute module being configured to carry out a processing instruction for activating the personal protection device in at least the second area, and
   wherein the control unit includes a clock generator, which is formed or situated outside the compute module, and wherein the clock generator is a quartz oscillator or includes a quartz oscillator.

9. A method for activating a personal protection device of a vehicle, the method comprising:
   reading out a processing instruction from a memory unit of a control unit, the control unit including a compute module, which is in one-piece and which includes a first area including a permanently wired processing structure and a second area including a programmable processing structure, the compute module being configured to carry out a processing instruction for activating the personal protection device in at least the second area;

loading the processing instruction into the second area of the compute module; and carrying out the processing instruction in the second area of the compute module to activate the personal protection device of the vehicle;

wherein the control unit includes a clock generator, which is formed or situated outside the compute module, and wherein the clock generator is a quartz oscillator or includes a quartz oscillator.

10. A non-transitory machine-readable memory medium, on which is stored a computer program, which is executable by a processor, comprising:

a program code arrangement having program code for preparing a startup of control units, by performing the following:

storing a first processing instruction in a memory unit of a first of the control units and storing a second processing instruction different from the first processing instruction in a memory unit of a second of the control units;

wherein the control units are for activating a personal protection device of a vehicle, and wherein each of the control units includes a compute module, which is in one-piece and which includes a first area including a permanently wired processing structure and a second area including a programmable processing structure, the compute module being configured to carry out a processing instruction for activating the personal protection device in at least the second area, and wherein each of the control units includes a clock generator, which is formed or situated outside the compute module, and wherein the clock generator is a quartz oscillator or includes a quartz oscillator.

11. A non-transitory machine-readable memory medium, on which is stored a computer program, which is executable by a processor, comprising:

a program code arrangement having program code for activating a personal protection device of a vehicle, by performing the following:

reading out a processing instruction from a memory unit of a control unit, the control unit including a compute module, which is in one-piece and which includes a first area including a permanently wired processing structure and a second area including a programmable processing structure, the compute module being configured to carry out a processing instruction for activating the personal protection device in at least the second area;

loading the processing instruction into the second area of the compute module; and carrying out the processing instruction in the second area of the compute module to activate the personal protection device of the vehicle;

wherein the control unit includes a clock generator, which is formed or situated outside the compute module, and wherein the clock generator is a quartz oscillator or includes a quartz oscillator.

* * * * *